(12) United States Patent
Kim et al.

(10) Patent No.: US 8,255,689 B2
(45) Date of Patent: Aug. 28, 2012

(54) METHOD AND SYSTEM FOR PERFORMING DISTRIBUTED VERIFICATION WITH RESPECT TO MEASUREMENT DATA IN SENSOR NETWORK

(75) Inventors: Eun Ah Kim, Seoul (KR); Jeong Hyun Yi, Daejeon (KR); Alexey Fomin, St. Petersburg (RU); Alexandria Afanasyeva, St. Petersburg (RU); Sergey Bezzateev, St. Petersburg (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1038 days.

(21) Appl. No.: 11/866,494

(22) Filed: Oct. 3, 2007

(65) Prior Publication Data

US 2008/0262798 A1      Oct. 23, 2008

(30) Foreign Application Priority Data

Jan. 31, 2007   (KR) ........................ 10-2007-0010301

(51) Int. Cl.
*H04L 29/06*   (2006.01)
(52) U.S. Cl. ........................... 713/170; 713/153; 726/26
(58) Field of Classification Search ........................ None
See application file for complete search history.

(56) References Cited

U.S. PATENT DOCUMENTS

| | | | | |
|---|---|---|---|---|
| 7,206,934 | B2 * | 4/2007 | Pabla et al. .................. | 713/168 |
| 7,743,123 | B2 * | 6/2010 | Wang et al. .................. | 709/222 |
| 7,856,100 | B2 * | 12/2010 | Wang et al. .................. | 380/30 |
| 2003/0012168 | A1 | 1/2003 | Elson et al. | |
| 2006/0098594 | A1 * | 5/2006 | Ganesh ......................... | 370/328 |
| 2008/0247539 | A1 * | 10/2008 | Huang et al. .................. | 380/28 |
| 2010/0098090 | A1 * | 4/2010 | Westhoff et al. .............. | 370/400 |
| 2010/0290617 | A1 * | 11/2010 | Nath .............................. | 380/29 |

FOREIGN PATENT DOCUMENTS

KR      2005-98203      10/2005

(Continued)

OTHER PUBLICATIONS

Sencun Zhu, Sanjeev Setia, and Sushil Jajodia. 2006. LEAP+: Efficient security mechanisms for large-scale distributed sensor networks. ACM Trans. Sen. Netw. 2, 4 (Nov. 2006), 500-528. D01=10.1145/1218556.1218559    http://doi.acm.org/10.1145/1218556.1218559.*

(Continued)

*Primary Examiner* — Eleni Shiferaw
*Assistant Examiner* — Jeffery Williams
(74) *Attorney, Agent, or Firm* — NSIP Law (57) ABSTRACT

A method and system for performing a distributed verification with respect to measurement data in a sensor network. The method of performing the distributed verification with respect to measurement data in a sensor network includes: verifying, by an aggregator, the measurement data received from each of a plurality of sensors; generating, by the aggregator, verification request data by using the verified measurement data; transmitting the verification request data to a verifier; and verifying, by the verifier, the aggregator via a predetermined number of sensors of the plurality of sensors and the verification request data. The method of performing a distributed verification with respect to measurement data in a sensor network further includes transmitting, by the aggregator, an aggregation result with respect to the measurement data to a base station when the aggregator is verified; and verifying, by the base station, the aggregation result.

31 Claims, 6 Drawing Sheets

FOREIGN PATENT DOCUMENTS

| KR | 2005-108533 | 11/2005 |
|---|---|---|
| WO | WO 2006/038163 | 4/2006 |

OTHER PUBLICATIONS

Mahimkar, A.; Rappaport, T.S.;, "SecureDAV: a secure data aggregation and verification protocol for sensor networks," Global Telecommunications Conference, 2004. GLOBECOM '04. IEEE, vol. 4, No., pp. 2175- 2179 vol. 4, Nov. 29-Dec. 3, 2004 doi: 10.1109/GLOCOM.2004.1378395 URL: http://ieeexplore.ieee.org/stamp/stamp.jsp?tp=&arnumber=1378395&isnumber=3.*

Adrian Perrig, Robert Szewczyk, J. D. Tygar, Victor Wen, and David E. Culler. 2002. SPINS: security protocols for sensor networks. Wirel. Netw. 8, 5 (Sep. 2002), 521-534. DOI=10.1023/A:1016598314198 http://dx.doi.org/10.1023/A:1016598314198.*

Chris Karlof, David Wagner, Secure routing in wireless sensor networks: attacks and countermeasures, Ad Hoc Networks, vol. 1, Issues 2-3, Sensor Network Protocols and Applications, Sep. 2003, pp. 293-315, ISSN 1570-8705, DOI: 10.1016/S1570-8705(03)00008-8. (http://www.sciencedirect.com/science/article/B7576-499CSFN-7/2/ad3f92c2d573d82839cd.*

Ronald Watro, Derrick Kong, Sue-fen Cuti, Charles Gardiner, Charles Lynn, and Peter Kruus. 2004. TinyPK: securing sensor networks with public key technology. In Proceedings of the 2nd ACM workshop on Security of ad hoc and sensor networks (SASN '04). ACM, New York, NY, USA, 59-64. D0I=10.1145/1029102.1029113 http://doi.acm.org/10.1145/1029102.10291.*

James Newsome, Elaine Shi, Dawn Song, and Adrian Perrig. 2004. The sybil attack in sensor networks: analysis \& defenses. In Proceedings of the 3rd international symposium on Information processing in sensor networks (IPSN '04). ACM, New York, NY, USA, 259-268. DOI=10.1145/984622.984660 http://doi.acm.org/10.1145/984622.984660.*

Bartosz Przydatek, Dawn Song, and Adrian Perrig. 2003. SIA: secure information aggregation in sensor networks. In Proceedings of the 1st international conference on Embedded networked sensor systems (SenSys '03). ACM, New York, NY, USA, 255-265. DOI=10.1145/958491.958521 http://doi.acm.org/10.1145/958491.958521.*

Lingxuan Hu; Evans, D.;, "Secure aggregation for wireless networks," Applications and the Internet Workshops, 2003. Proceedings. 2003 Symposium on, vol., No., pp. 384-391, Jan. 27-31, 2003 doi: 10.1109/SAINTW.2003.1210191 URL: http://ieeexplore.ieee.org/stamp/stamp.jsp?tp=&arnumber=1210191&isnumber=27233.*

* cited by examiner

METHOD AND SYSTEM FOR PERFORMING DISTRIBUTED VERIFICATION WITH RESPECT TO MEASUREMENT DATA IN SENSOR NETWORK

CROSS-REFERENCE TO RELATED APPLICATION

This application claims the benefit of Korean Patent Application No. 2007-10301, filed in the Korean Intellectual Property Office on Jan. 31, 2007, the disclosure of which is incorporated herein by reference.

BACKGROUND OF THE INVENTION

1. Field of the Invention

Aspects of the present invention relate to a method and system for performing a distributed verification with respect to measurement data in a sensor network. More particularly, aspects of the present invention relate to a method and system for performing a distributed verification with respect to measurement data in a sensor network that can reduce an overhead by reducing an amount of information transmitted to a base station via an aggregator and can efficiently verify measurement data received from a sensor and improve security by directly verifying the aggregator itself in a distributed method.

2. Description of the Related Art

Sensor networks are designed to be able to collect information aggregated in a variety of sensors wirelessly. As wireless personal area networks (WPANs) and ad hoc networks have been developed, development of technologies using sensor networks have been active. Currently, technologies using sensor networks are used to find logistics information flow by attaching tags to goods using radio frequency identification (RFID) technology.

Sensors can also measure information such as temperatures, position information, pressure, fingerprints, gases, and the like. Accordingly, sensors can be used to acquire information about particular regions. For example, when a plurality of sensors is dropped into alpine regions where information is difficult to obtain, various information, such as temperatures or wind forces, can be acquired by receiving the information from the plurality of sensors.

Figure 1:
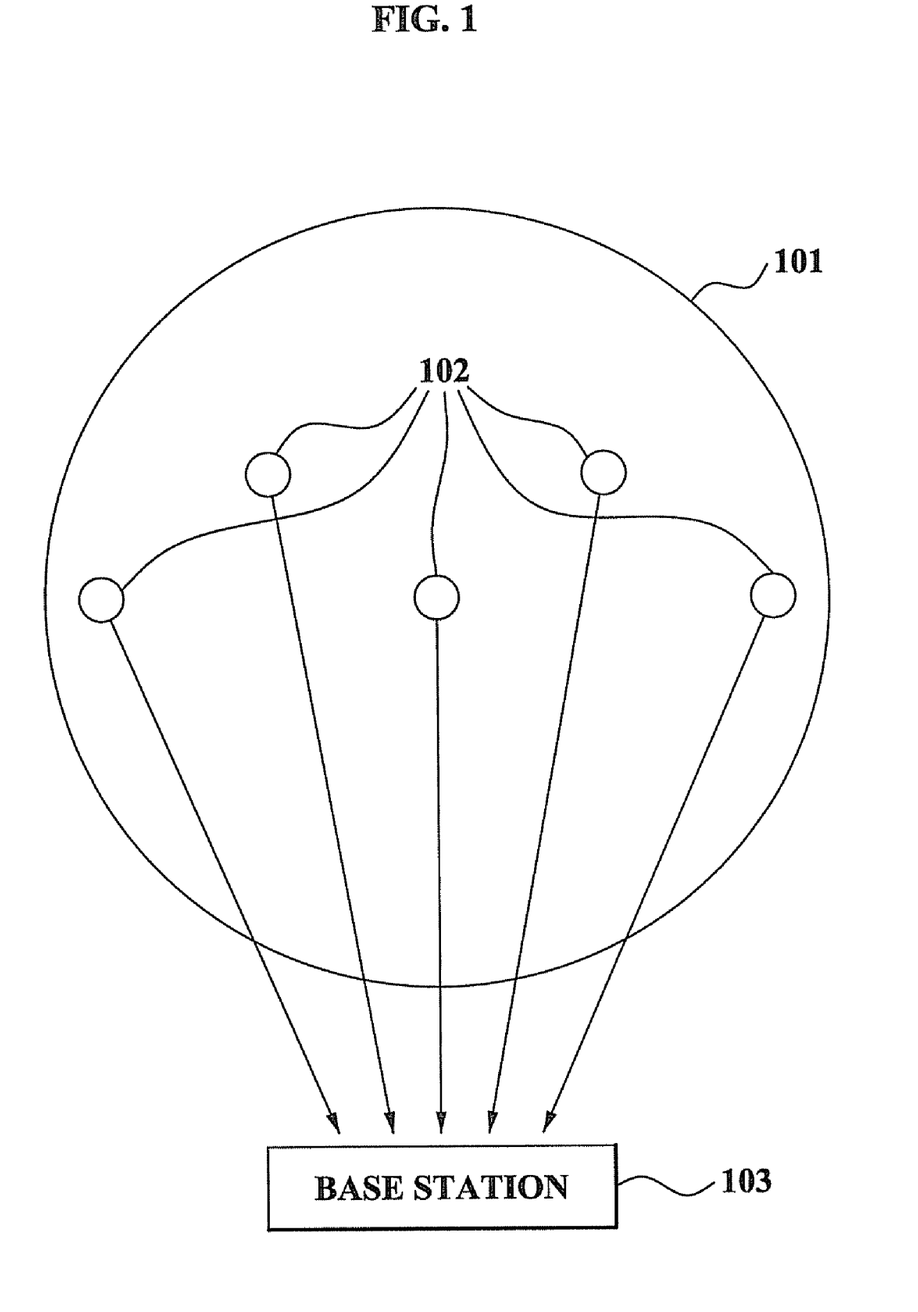
FIG. 1 illustrates an example of a sensor network in a conventional art.

FIG. 1 illustrates an example of a sensor network in a conventional art. A plurality of sensors 102 existing in a particular area 101 transmits measurement data to a base station 103. The base station 103 acquires information about the particular area 101 using the measurement data. The measurement data is measured by the plurality of sensors 102. The plurality of sensors 102 is generally densely deployed in a random way or near a phenomenon area. The plurality of sensors 102 generates a considerable data flow for the base station 103 controlling the network.

Nodes included in the sensor network use techniques for an ad hoc network, such as building a wireless communication network on their own, collecting data, using a broadcast communication paradigm as a communication method, and the like. However, the sensor network includes a plurality of nodes, and thus the sensor network needs to process a large amount of information generated in each node. Techniques for ad hoc networks cannot be applied to the sensor network due to properties of the sensor network, such as a susceptibility to failure of nodes. Accordingly, an efficient communication protocol and a data processing algorithm is required for the sensor network.

Since the sensor network must operate on limited resources, such as computation capability, memory, and battery energy, transmitting the data flow described above to the base station 102 consumes excessive amounts of power. When the plurality of sensors 102 is deployed in a hostile territory, security for the sensor network, such as integrity, confidentiality, and authenticity of data is needed. However, the cryptographic techniques of the conventional art may not be used due to the limited resources of the network.

Thus, a method and system for performing a distributed verification with respect to measurement data in a sensor network is needed.

SUMMARY OF THE INVENTION

Aspects of the present invention provide a method and system for performing a distributed verification with respect to measurement data in a sensor network.

Aspects of the present invention also provide a method and system for performing a distributed verification with respect to measurement data in a sensor network where a plurality of nodes in the sensor network is classified into a plurality of logical clusters, an aggregator existing in each of the plurality of clusters receives and verifies measurement data of sensors included in a same cluster, transmits the measurement data to a base station, and thus distributed measurement data is verified and the sensor network can be efficiently managed.

Aspects of the present invention also provide a method and system for performing a distributed verification with respect to measurement data in a sensor network where a verifier, which is randomly chosen by a base station, requests measurement data from a predetermined number of sensors and verifies an aggregator based on the measurement data, thus improving the security of the sensor network.

According to an aspect of the present invention, a method of performing a distributed verification with respect to measurement data in a sensor network is provided. The method includes verifying, by an aggregator, the measurement data received from each of a plurality of sensors; generating, by the aggregator, verification request data using the verified measurement data; transmitting the verification request data to a verifier; and verifying, by the verifier, the aggregator via a predetermined number of sensors out of the plurality of sensors and the verification request data. According to another aspect of the present invention, the method of performing a distributed verification with respect to measurement data in a sensor network further includes transmitting, by the aggregator, an aggregation result with respect to the measurement data to a base station when the aggregator is verified; and verifying, by the base station, the aggregation result. The aggregator generates the measurement data and verification confirmation data using a signature of the verifier received from the verifier, and transmits the measurement data and the verification confirmation data to the base station.

According to another aspect of the present invention, the method comprises receiving a first message authentication code (MAC) associated with the measurement data from the plurality of sensors; wherein the verifying of the measurement data includes calculating a second MAC with respect to the measurement data using a plurality of keys shared between each of the plurality of sensors and the aggregator, and verifying the measurement data if the first MAC and the second MAC are identical.

According to another aspect of the present invention, the generating of the verification request data includes: calculating a MAC with respect to the measurement data using a key shared between the verifier and the aggregator; and generating the verification request data including the measurement data and the third MAC.

According to another aspect of the present invention, the verifying of the aggregator via the predetermined number of sensors and the verification request data includes: verifying the verification request data received from the aggregator; randomly choosing the predetermined number of sensors; requesting measurement data from each of the predetermined number of sensors; and verifying the aggregator based on measurement data received according to the request.

According to another aspect of the present invention, a method of performing a distributed verification with respect to measurement data collected by an aggregator in a verifier is provided. The method includes: choosing a predetermined number of sensors according to verification request data received from the aggregator; verifying the aggregator using measurement data received from the predetermined number of sensors; generating a signature using a key shared with the aggregator; and transmitting the signature to the aggregator. According to another aspect of the present invention, the method comprises receiving the measurement data from each of a plurality of sensors existing in a same cluster; verifying the measurement data; and transmitting verification request data with respect to the generated measurement data using a key shared with the verifier. The verification request data includes the measurement data and a MAC generated using a key shared between the aggregator and the verifier.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to a distributed verification where an aggregator, which aggregates measurement data measured by a sensor in a sensor network, verifies the measurement data and verifies the aggregator using a predetermined verifier.

Figure 2:
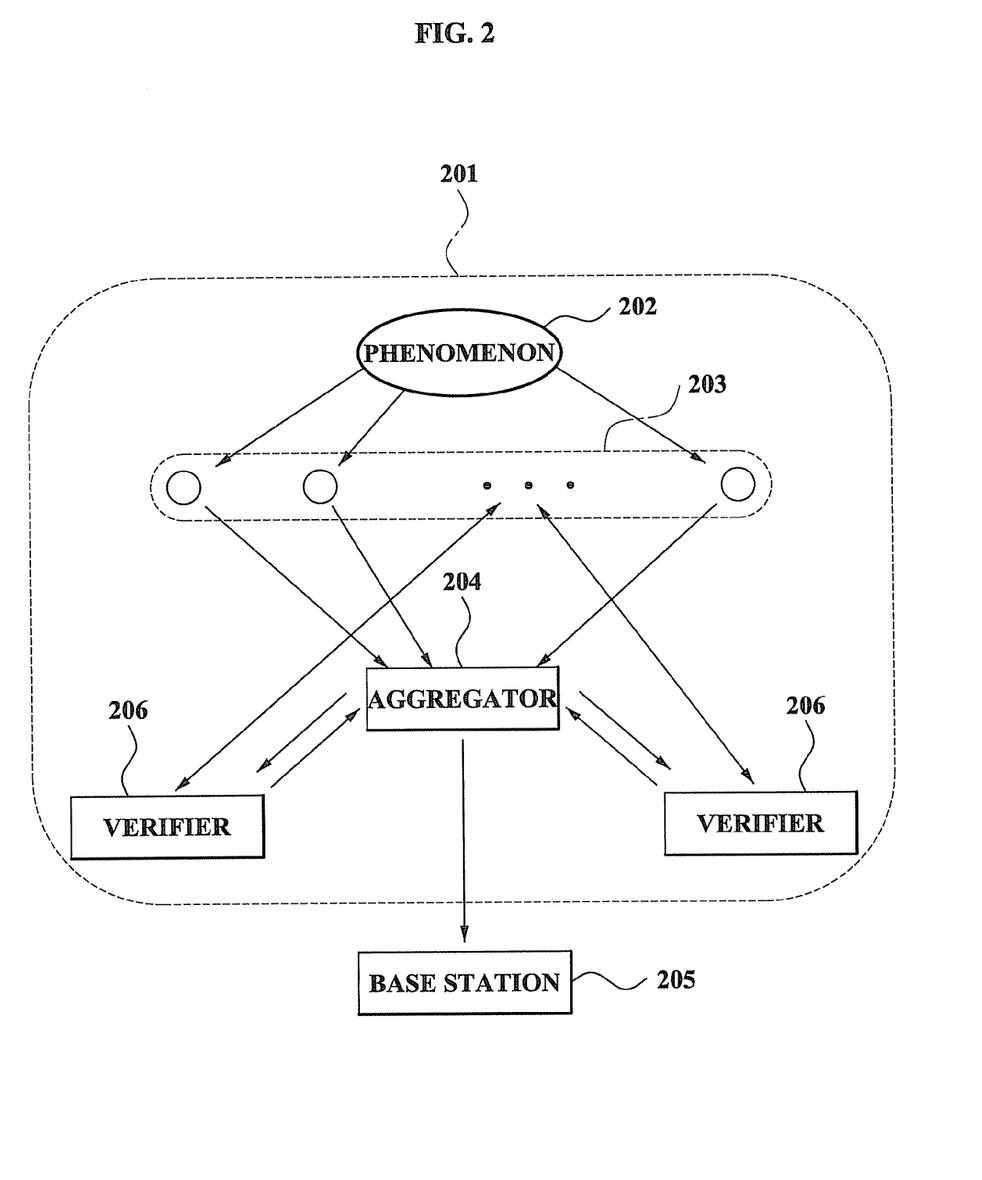
FIG. 2 illustrates a system for performing a distributed verification according to an embodiment of the present invention.

FIG. 2 illustrates a system for performing a distributed verification according to an embodiment of the present invention. A plurality of sensors 203 generates measurement data with respect to a phenomenon 202 and transmits measurement data to an aggregator 204. The phenomenon 202 is generated in a cluster 201 of the sensor network. The aggregator 204 verifies the measurement data and generates an aggregation result. The aggregation result is a set of the measurement data. The aggregator 204 transmits the aggregation result to at least one verifier 206. The verifier 206 is randomly chosen by a base station 205.

The verifier 206 receiving the aggregation result verifies the aggregation result and randomly chooses a predetermined number of sensors from the plurality of sensors 203. The verifier 206 requests the measurement data generated by the predetermined number of sensors from the predetermined number of sensors. The verifier 206 verifies the aggregator 204 when the measurement data received from the predetermined number of sensors according to the request and the measurement data included in the aggregation result are identical.

The verifier 206 generates a signature with respect to the aggregation result and transmits the signature to the aggregator 204. The aggregator 204 transmits the aggregation result, a message authentication code (MAC) with respect to the aggregation result, and the signature to the base station 205. The base station 205 verifies the aggregation result via the MAC and the signature, and thereby can acquire valid information about the phenomenon 202. The MAC may be generated in various ways. For example, the MAC may be a hash value generated by a one-way hash function. When calculating the hash value, a secret key between two communication nodes can be used, and the hash value can be calculated without the secret key as well. Although the aspects of the invention described herein refer to MACs, it is understood that other aspects of the invention may use other cryptographic techniques, such as public key cryptography.

Figure 3:
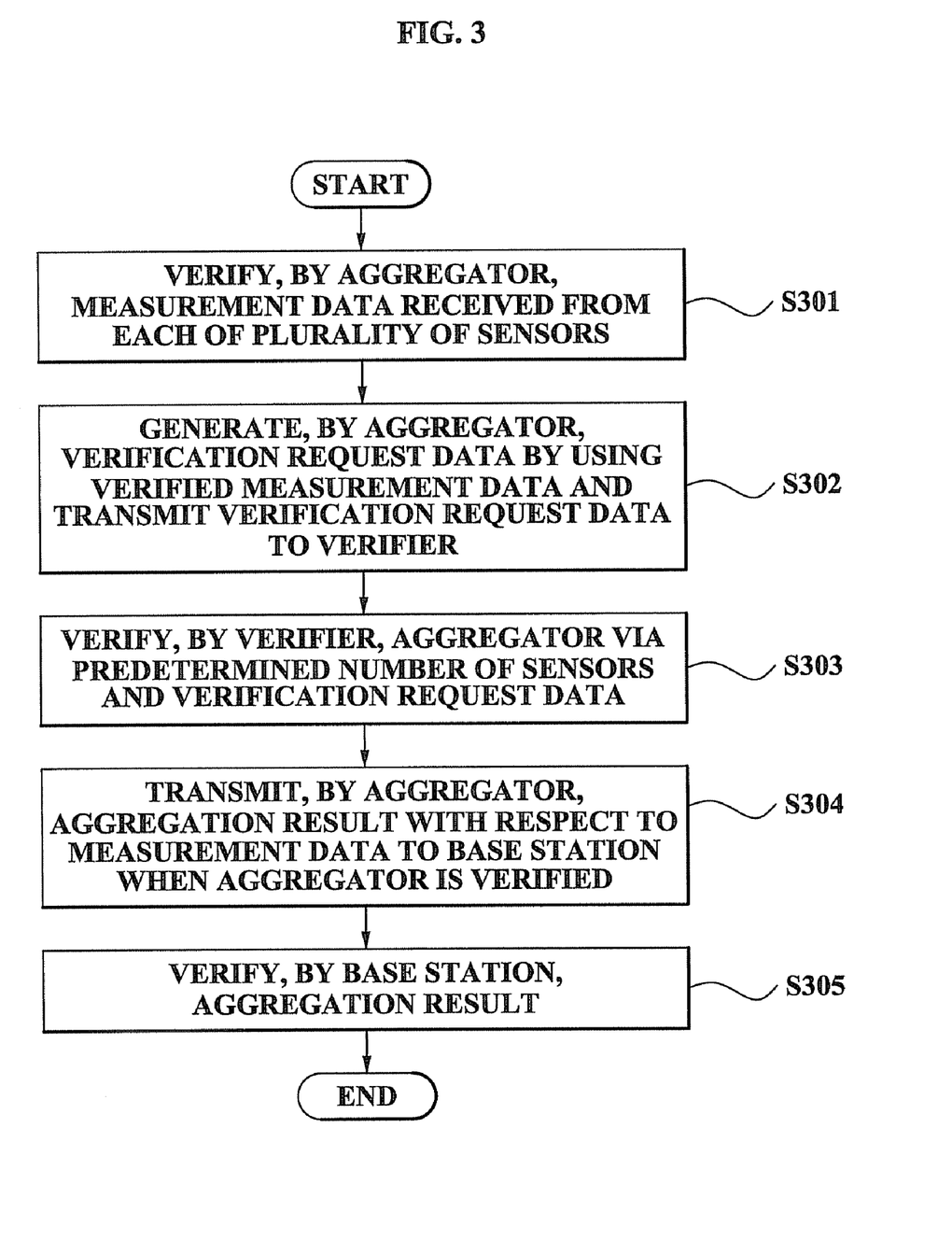
FIG. 3 is a flowchart of a technique of performing a distributed verification with respect to measurement data in a sensor network according to an embodiment of the present invention.

A technique of performing a distributed verification with respect to measurement data is described in detail with reference to FIGS. 3 and 4. FIG. 3 is a flowchart of a technique of performing a distributed verification with respect to measurement data in a sensor network according to an embodiment of the present invention.

In operation S301, the aggregator 204 verifies measurement data received from each of the plurality of sensors 203. The plurality of sensors 203 may be all devices existing in a particular area to collect information according to the purpose of the sensor network. The plurality of sensors 203 collects appropriate information, collects the measurement data via the information, and transmits the measurement data to the aggregator 204. The plurality of sensors 203 calculates a first message authentication code (MAC) associated with the measurement data using first keys shared with the aggregator 204 to verify the measurement data. The plurality of sensors 203 transmits the measurement data and the first MAC to the aggregator.

The aggregator 204 further receives the first MAC associated with the measurement data from the plurality of sensors. The aggregator 204 calculates a second MAC with respect to the measurement data using the first keys to verify the measurement data and compares the first MAC and the second MAC. The aggregator 204 verifies measurement data when the first MAC and the second MAC are identical.

The aggregator 204 verifies the measurement data received from each of the plurality of sensors 203. The aggregator 204 includes the first keys that are shared between each of the plurality of sensors 203 and the aggregator 204. Each of the plurality of sensors 203 may have a different first key. The aggregator 204 receives the first MAC generated using the first keys corresponding to each of the plurality of sensors 203, and verifies the measurement data for each sensor.

In operation S302, the aggregator 204 generates verification request data using the verified measurement data and transmits the verification request data to the verifier 206. The aggregator 204 calculates a third MAC with respect to the measurement data using a second key shared between the verifier 206 and the aggregator 204 and generates the verification request data. The verification request data includes the measurement data and the third MAC. The verification request data is transmitted to the verifier 206.

If a plurality of verifiers 206 is provided, the aggregator 203 may calculate the third MAC with respect to the measurement data using the second key. The second key is shared between the plurality of verifiers 206 and the aggregator 204. Each of the plurality of verifiers 206 may have a different second key. The aggregator 203 generates the verification request data corresponding to the plurality of verifiers 206.

In operation S303, the verifier 206 verifies the aggregator 203 via a predetermined number of sensors of the plurality of sensors 203 and the verification request data. The verifier 206 verifies the verification request data received from the aggregator 204 using the third MAC included in the verification request data. A fourth MAC with respect to the measurement data included in the verification request data is calculated using the second key. The verification request data is verified by comparing the fourth MAC and the third MAC.

The verifier 206 randomly chooses the predetermined number of sensors 203. The verifier requests measurement data from each of the predetermined number of sensors 203 in order to verify the aggregator 204. A security issue in the sensor network exists if the aggregator 204 is not verified. For example, if the security of the aggregator 204 in a sensor network in a territory of a hostile country cannot be assured, the hostile country can transmit false information via the aggregator 204. Accordingly, the sensor network may be unreliable.

To prevent the above-described or similar problems, the verifier 206 verifies the aggregator 204 based on the measurement data received according to the request by comparing the measurement data of the predetermined number of sensors 203 and the measurement data transmitted from the aggregator 204. The verifier 206 calculates a signature with respect to the verifying and a fifth MAC with respect to the signature, and transmits the signature and the fifth MAC to the aggregator 204. The fifth MAC is used to verify the signature.

In operation S304, the aggregator 204 transmits an aggregation result with respect to the measurement data to the base station 205 when the aggregator 204 is verified. The aggregator 204 verifies the validity of the signature using the fifth MAC, and can use a third key shared between the aggregator 204 and the verifier 206 to calculate the fifth MAC.

The aggregator 204 may generate a sixth MAC with respect to the measurement data using a fourth key shared between the aggregator 204 and the base station 205, and may calculate a first verification value using the signature received from the verifier 206 and a predetermined calculation method with respect to the sixth MAC. The aggregator 204 generates the aggregation result including the measurement data and the first verification value, and transmits the aggregation result to the base station 205.

The aggregator 204, the verifier 206, and the plurality of sensors 203 of the sensor network can be classified into a plurality of clusters, and be included in a same cluster, such as cluster 201. The plurality of clusters included in the sensor network generates the aggregation result through operations S301, S302, and S303 for each cluster, and transmits the aggregation result to the base station 205. Accordingly, the base station 205 can ascertain a situation of an area where the plurality of sensors is installed, and recognize phenomena generated in the area.

In operation S305, the base station 205 verifies the aggregation result. The base station 205 calculates the first verification value using the signature received from the verifier 206 and the measurement data included in the aggregation result, and compares the first verification value and second verification value. The second verification value may be further included in the aggregation result.

The calculation method can be used to calculate the second verification value. The aggregator 204 and the base station 205 include the same calculation method, and thereby can verify the validity of the aggregation result. If the first verification value and the second verification value are identical, the aggregation result is verified, and is determined to be reliable.

Figure 4:
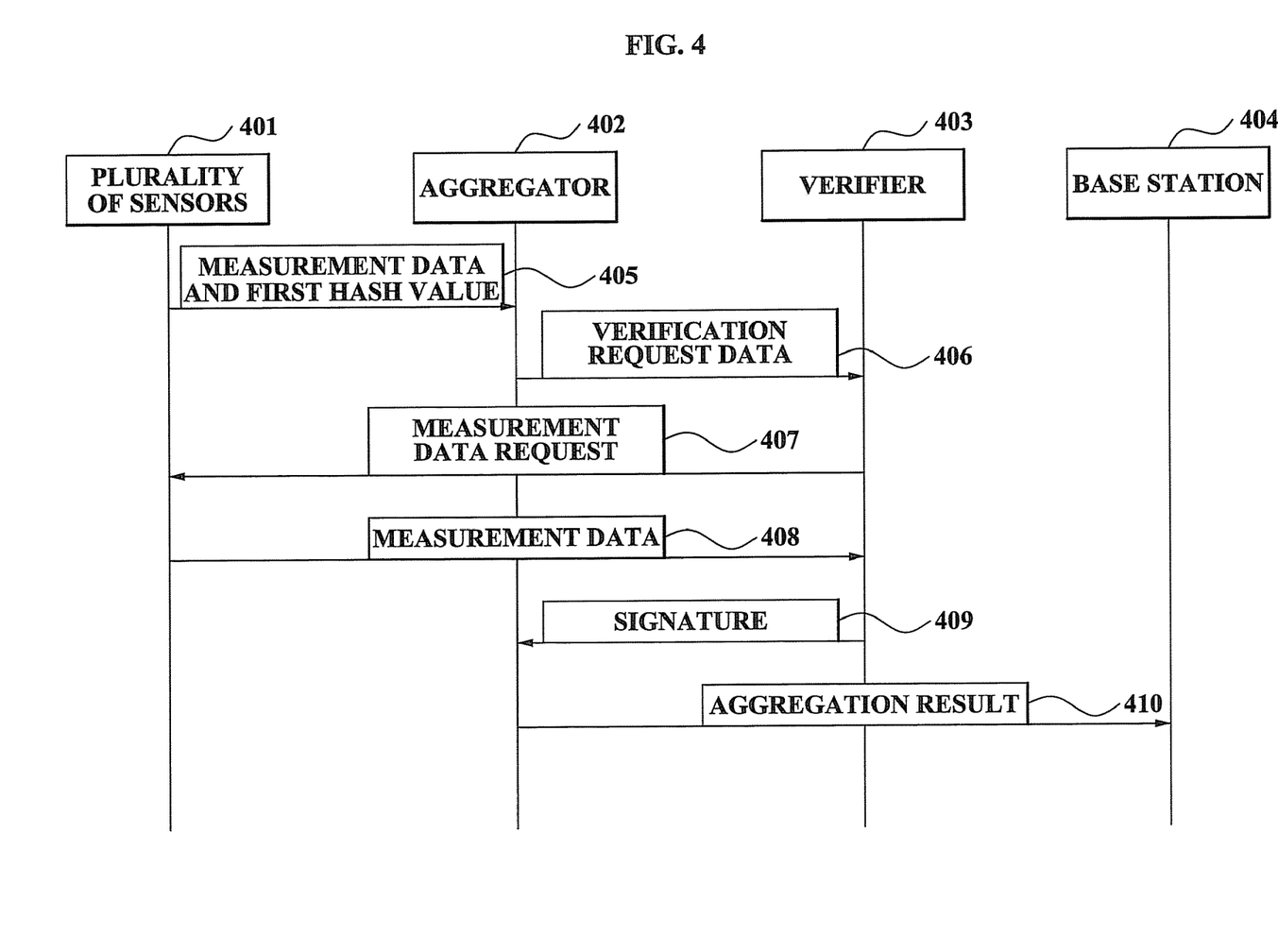
FIG. 4 is a flowchart of a data flow of nodes in a sensor network according to an embodiment of the present invention.

FIG. 4 is a flowchart of a data flow of nodes in a sensor network according to an embodiment of the present invention. FIG. 4 illustrates a data flow among a plurality of sensors 401, an aggregator 402, a plurality of verifiers 403, and a base station 404 included in the sensor network.

The plurality of sensors 401 transmits measurement data and the first MAC to the aggregator 402 in operation S405. The measurement data and the first MAC can be represented as Equation 1:

$$S_i \to A: \{data_i, MAC(K_{S_i,A}, data_i)\}. \quad \text{[Equation 1]}$$

In Equation 1, $S_i$ refers to an $i^{th}$ sensor of the plurality of sensors 401, A refers to the aggregator 402, $data_i$ refers to measurement data of the $i^{th}$ sensor, $MAC(K_{S_i,A}, data_i)$ refers to the first MAC with respect to the measurement data, and $K_{S_i,A}$ refers to a key shared between the $i^{th}$ sensor and the aggregator 402.

In operation S406, the aggregator 402 generates verification request data after receiving the measurement data and the first MAC from the plurality of sensors 401, and transmits the verification request data to a verifier among the plurality of verifiers 403. The verification request data can be represented as Equation 2:

$$A \to \text{Verifiers}: \{DATA, MAC(K_{V_1,A}, DATA), \ldots, MAC(K_{V_l,A}, DATA)\}. \quad \text{[Equation 2]}$$

Here, Verifiers refers to a plurality of verifiers 403, and DATA is a set of the measurement data represented as DATA={$data_1, \ldots, data_n$}. As shown in Equation 2, the verification request data includes the DATA and the third MAC. The third MAC is calculated for each of the plurality of verifiers 403 and corresponds to each of the plurality of verifiers 403.

The plurality of verifiers 403 requests measurement data from each of the predetermined number of sensors selected from the plurality of sensors 401 after receiving the verification request data in operation S407. In operation S408, the predetermined number of sensors transmits the measurement data to the plurality of verifiers 403. A process of the transmitting measurement data of a $j^{th}$ sensor of the predetermined number of sensors can be represented as Equation 3:

$$S_j \rightarrow V_i: \{data_j, MAC(K_{S_j, V_i}, data_j)\}.$$ [Equation 3]

The verifier 403 receiving the measurement data may verify the aggregator 402 by comparing the measurement data and measurement data included in the verification request data. The plurality of verifiers 403 generates a signature with respect to the verification and transmits the signature to the aggregator 402 in operation S409. A process of transmitting the signature from an $i^{th}$ verifier of the plurality of verifiers 403 to the aggregator 402 can be represented as Equation 4:

$$V_i \rightarrow A: \{signature_{V_i}, MAC(K_{V_i, A}, signature_{V_i})\}$$ [Equation 4]

Here, the signature is represented as $signature_{1_i} = MAC(K_{1_i, BS}, aggregation\_result)$ and aggregation_result refers to a value representing the entire measurement data as an aggregation result of the measurement data. For example, an average value with respect to a predetermined amount of measurement data can be used as the aggregation result.

In operation S410, the aggregator 402 receiving the signature transmits to the base station 404 the aggregation result generated using the measurement data, the sixth MAC with respect to the measurement data, and the signature. The aggregation result may be represented as Equation 5:

$$A \rightarrow BS: \{aggregation\_result, signature_{T_i} \oplus \ldots \\ \oplus signature_{T_t} \oplus MAC(K_{A, BS}, aggregation\_result)\}$$ [Equation 5]

Here, $\oplus$ refers to an exclusive OR (XOR). The sixth MAC may be calculated using the measurement data and a third key shared between the aggregator 402 and the base station 404.

The aggregator 402 transmits the aggregation result and a value calculated using an XOR operation between the signature and the sixth MAC to the base station 404. The base station 404 verifies the aggregation result using a value calculated in the same way.

Figure 5:
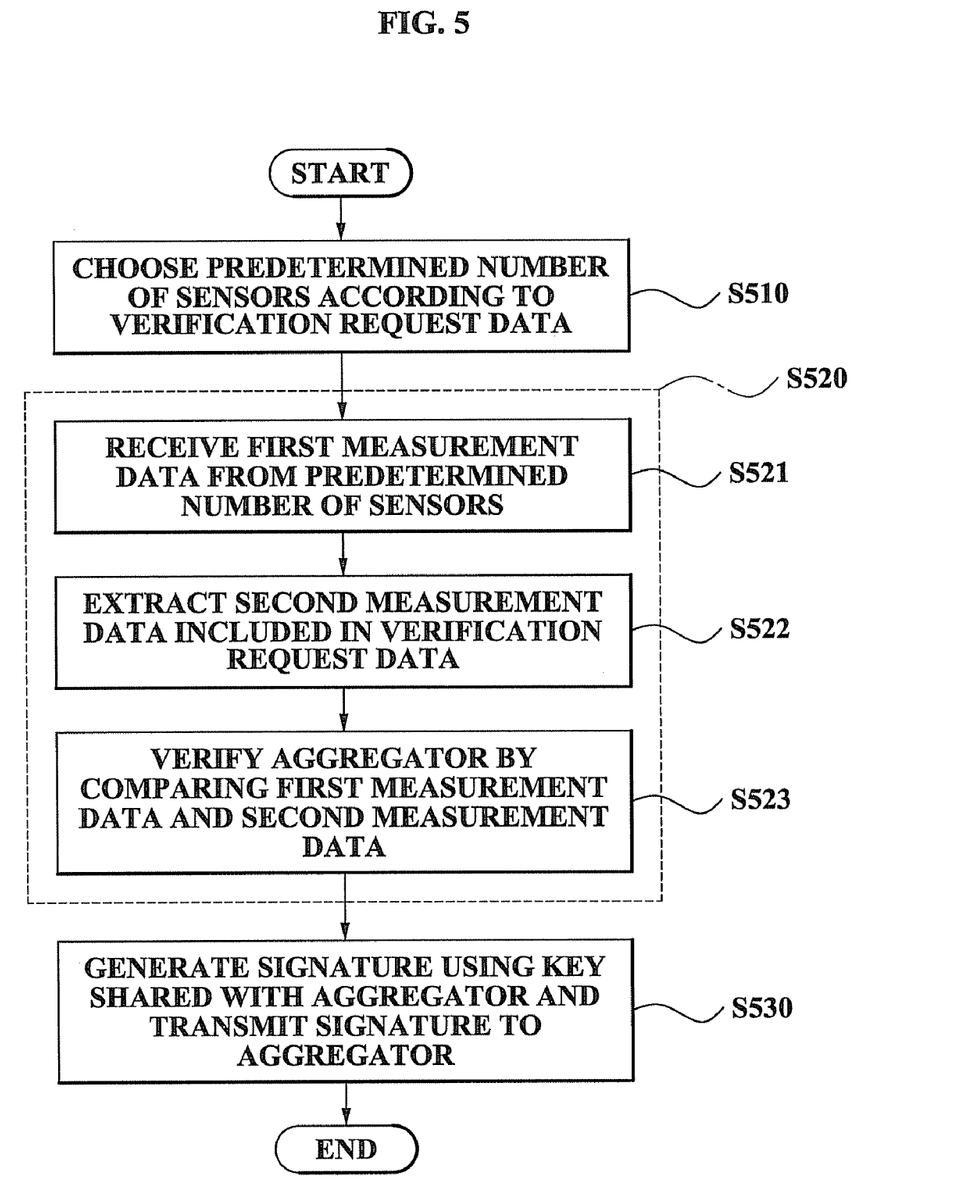
FIG. 5 is a flowchart of a technique of performing a distributed verification with respect to measurement data collected by an aggregator in a verifier according to another embodiment of the present invention.

FIG. 5 is a flowchart of a technique of performing a distributed verification with respect to measurement data collected by an aggregator in a verifier according to another embodiment of the present invention.

In operation S510, the verifier chooses a predetermined number of sensors according to verification request data received from the aggregator. The aggregator receives and verifies first measurement data from each of a plurality of sensors existing in a same cluster. The aggregator transmits the verification request data with respect to the generated measurement data to the verifier using a first key shared with the verifier. The verification request data includes the measurement data and a first MAC generated using a key shared between the aggregator and the verifier.

The verifier receives the verification request data and verifies the first measurement data via the first MAC included in the verification request data. The verifier generates a second MAC with respect to the first measurement data using the first key shared with the aggregator. The verifier verifies the first measurement data when the first MAC and the second MAC are identical.

The verifier chooses the predetermined number of sensors from the plurality of sensors after verifying the first measurement data, and requests second measurement data from the predetermined number of sensors. The second measurement data is measurement data of the predetermined number of sensors.

In operation S520, the verifier verifies the aggregator using the second measurement data. Verifying the second measurement data includes receiving the first measurement data included in the predetermined number of sensors from the predetermined number of sensors in operation S521, extracting the second measurement data included in the verification request data in operation S522, and verifying the aggregator when the first measurement data and the second measurement data are identical in operation S523. It can be confirmed that the second measurement data collected by the aggregator has not been changed by comparing the first measurement data and the second measurement data. Accordingly, the aggregator can be verified.

In operation S530, the verifier generates a signature using a key shared with the aggregator and transmits the signature to the aggregator. The verifier generates a third MAC with respect to the signature using a second key shared with the aggregator and transmits the signature and the third MAC to the aggregator. The aggregator verifies the signature using the signature and the third MAC.

The aggregator calculates a fourth MAC with respect to the measurement data using a key shared with a base station, generates an aggregation result, and transmits the aggregation result to the base station. The aggregation result includes the measurement data, the fourth MAC, and the signature. The aggregator generates the aggregation result using the signature received from the verifier according to the verification request data. For example, the aggregation result can be generated as described with reference to Equation 5. The aggregation result is transmitted to the base station. The aggregator calculates the fourth MAC with respect to the measurement data using the key shared with the base station and transmits the aggregation result including the measurement data and the signature to the base station by including the fourth MAC.

The fourth MAC may be calculated while generating the aggregation result. Accordingly, the aggregation result can be generated to include the fourth MAC. Similar to Equation 5, the aggregation result may include a value calculated via an XOR between the fourth MAC and the signature. Since the fourth MAC and the signature are for verifying the aggregator and the measurement data, the fourth MAC and the signature may be transmitted to the base station in various ways besides the method described above.

When the technique of performing a distributed verification with respect to measurement data in a sensor network according to the present invention is used, nodes, namely the aggregator, the verifier, and the plurality of sensors of the sensor network, are classified into a plurality of logical clusters. The aggregator receives and verifies measurement data of the plurality of sensors included in a same cluster and transmits the measurement data to a base station. Accordingly, distributed measurement data is verified and the sensor network can be managed efficiently.

The verifier, which is randomly chosen by the base station, requests the measurement data from a predetermined number of sensors and verifies the aggregator based on the measurement data. The predetermined number of sensors is randomly chosen by the base station. Accordingly, the security of the sensor network can be improved.

Figure 6:
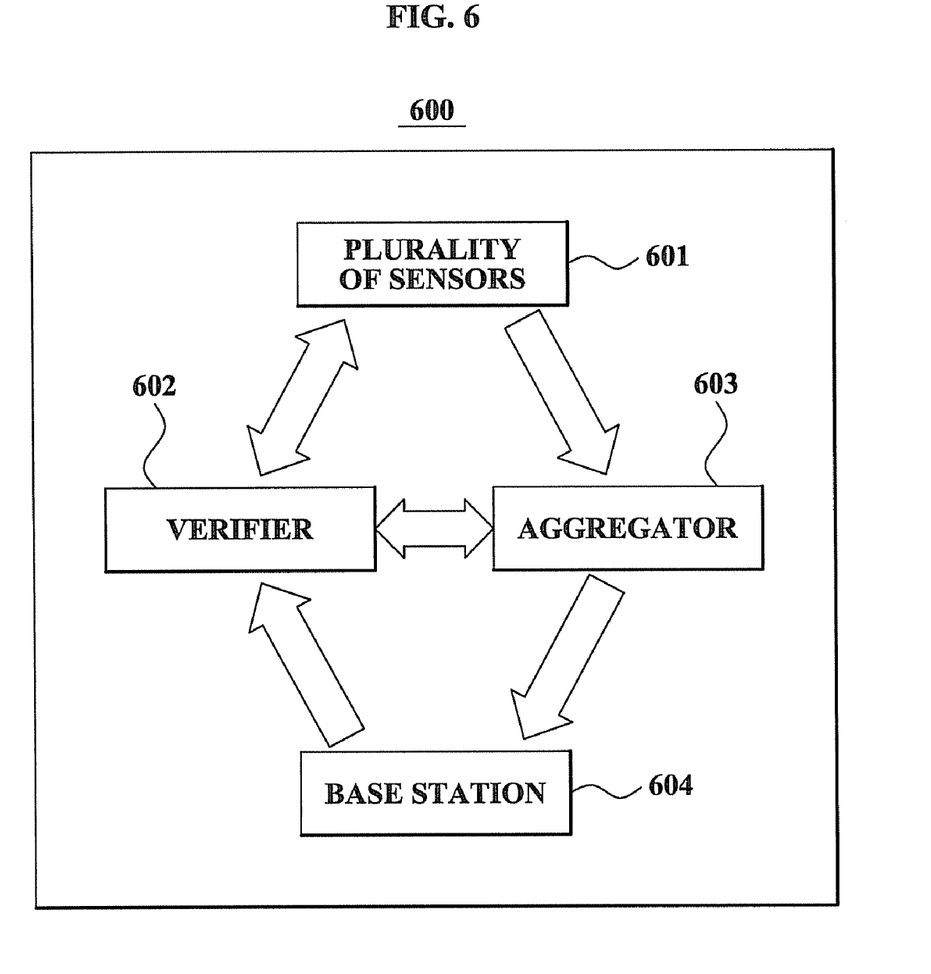
FIG. 6 is a block diagram illustrating a configuration of a system for performing a distributed verification according to still another embodiment of the present invention.

FIG. 6 is a block diagram illustrating a configuration of a system for performing a distributed verification 600 according to still another embodiment of the present invention. The system 600 includes a plurality of sensors 601, an aggregator 603, a verifier 602, and a base station 604.

The plurality of sensors 601 generates measurement data and transmits the measurement data to the aggregator 603. The plurality of sensors 601 may refer to all devices existing in a particular area to collect information depending on the purpose of the sensor network. The plurality of sensors 601 collects appropriate information, collects the measurement data using the information, and transmits the measurement data to the aggregator 603.

The plurality of sensors 601 calculates a first MAC associated with the measurement data using first keys, shared with the aggregator 603, to verify a validity of the measurement data. The plurality of sensors 601 transmits the measurement data and the first MAC to the aggregator 603.

The aggregator 603 generates verification request data based on the measurement data. The aggregator 603 includes a receiving unit, a second MAC calculation unit, and a measurement data verification unit, which are not illustrated in FIG. 6. The aggregator 603 according to other aspects of the present invention may include additional units or may incorporate one or more units into a single component.

The receiving unit receives the measurement data and the first MAC associated with the measurement data from the plurality of sensors 601. The second MAC calculation unit calculates a second MAC with respect to the measurement data using the first key shared between each of the plurality of sensors 601 and the aggregator 603. The measurement data verification unit verifies the measurement data when the first MAC and the second MAC are identical. The aggregator 603 verifies the measurement data, received before generating the verification request data, using the first MAC and the second MAC.

The aggregator 603 may further include a third MAC calculation unit, a verification request data generation unit, and a transmission unit, which are not illustrated in FIG. 6. The third MAC calculation unit calculates a third MAC with respect to the measurement data using a second key shared between the verifier 602 and the aggregator 603. The verification request data generation unit generates the verification request data including the measurement data and the third MAC. The transmission unit transmits the verification request data to the verifier 602. The third MAC can be used to verify the verification request data.

The verifier 602 verifies the aggregator 603 via the verification request data and a predetermined number of sensors randomly chosen from the plurality of sensors 601. The verifier 602 may include a verification request data verification unit, a measurement data request unit, an aggregator verification unit, and a transmission unit, which are not illustrated in FIG. 6. According to other aspects of the present invention, the verifier 602 may include additional units or may incorporate one or more units into a single component.

The verification request data verification unit verifies the verification request data received from the aggregator 603. The measurement data request unit requests measurement data from each of the predetermined number of sensors. The aggregator verification unit verifies the aggregator 603 based on the measurement data received according to the request. The transmission unit transmits a signature with respect to the verifying and a fourth MAC with respect to the signature to the aggregator 603. The fourth MAC may be used to verify the signature in the aggregator 603.

The base station 604 verifies an aggregation result received from the aggregator 603. The aggregation result may include the signature generated by the verifier 602, the measurement data, and the fourth MAC with respect to the measurement data. The base station 604 may verify the measurement data using the signature and the fourth MAC.

When a technique of performing a distributed verification with respect to measurement data in a sensor network according to aspects of the present invention is used, nodes in the sensor network, that is, the aggregator 603, the verifier 602, and the plurality of sensors 601, are classified into a plurality of clusters. The aggregator 603 receives and verifies measurement data of the plurality of sensors 601 included in a same cluster and transmits the measurement data to a base station 604. Accordingly, distributed measurement data is verified and the sensor network can be managed efficiently.

The verifier 602, which is randomly chosen by the base station 604, requests the measurement data from a predetermined number of sensors and verifies the aggregator based on the measurement data. Accordingly, security of the sensor network can be improved.

The above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, a plurality of nodes in a sensor network is classified into a plurality of logical clusters. An aggregator receives and verifies measurement data of the plurality of sensors included in a same cluster and transmits the measurement data to a base station. Distributed measurement data is verified and the sensor network may be managed efficiently.

According to additional aspects of the present invention, a verifier, which is randomly chosen by a base station, requests measurement data from a predetermined number of sensors and verifies an aggregator based on the measurement data. Security of the sensor network can thus be improved.

Although a few embodiments of the present invention have been shown and described, it would be appreciated by those skilled in the art that changes may be made in this embodiment without departing from the principles and spirit of the invention, the scope of which is defined by the claims and their equivalents. As an example, in FIG. 4, although an operation of the sixth MAC and the signature is performed using the XOR to verify the validity of the aggregation result, the operation is an example for describing the present invention, and thus a same effect can be obtained by other predetermined methods between the aggregator 402 and the base station 404.

What is claimed is:

1. A method of performing a distributed verification with respect to measurement data in a sensor network as embodied by a computer, the method comprising:

verifying, by an aggregator, the measurement data received from each of a plurality of sensors;

generating, by the aggregator, verification request data using the verified measurement data;

transmitting the verification request data to a verifier;

verifying, by the verifier, the aggregator via a predetermined number of sensors out of the plurality of sensors and the verification request data;

transmitting, by the aggregator, an aggregation result with respect to the measurement data to a base station when the aggregator is verified; and verifying, by the base station, the aggregation result, wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

2. The method of claim 1, further comprising:

receiving, by the aggregator, a plurality of first message authentication codes (MACs) associated with the measurement data from the plurality of sensors;

wherein the verifying of the measurement data comprises calculating a plurality of second MACs with respect to the measurement data using a plurality of keys shared between each of the plurality of sensors and the aggregator, and verifying the measurement data if the plurality of first MACs and the plurality of second MACs are identical.

3. The method of claim 1, wherein the generating comprises:

calculating a MAC with respect to the measurement data using a key shared between the verifier and the aggregator; and generating the verification request data including the measurement data and the MAC.

4. The method of claim 1, wherein the verifying of the aggregator via the predetermined number of sensors and the verification request data comprises:

verifying the verification request data received from the aggregator;

randomly choosing the predetermined number of sensors;

requesting measurement data from each of the predetermined number of sensors; and verifying the aggregator based on measurement data received according to the request.

5. The method of claim 4, wherein:

the verification request data includes the measurement data and a first MAC associated with the measurement data; and the verifying of the verification request data comprises calculating a second MAC with respect to the measurement data included in the verification request data, and verifying the verification request data when the first MAC and the second MAC are identical.

6. The method of claim 4, wherein the verifying of the aggregator via the predetermined number of sensors and the verification request data further comprises:

calculating a signature with respect to the verifying and a MAC with respect to the signature, and transmitting the signature and the MAC to the aggregator.

7. The method of claim 1, wherein the verifying of the aggregation result comprises:

calculating a first verification value using the signature received from the verifier and the measurement data included in the aggregation result; and verifying the aggregation result when the first verification value and a second verification value are identical, the second verification value being further included in the aggregation result.

8. The method of claim 1, wherein the aggregator, the verifier, and the plurality of sensors of the sensor network are classified into a plurality of clusters, and are included in a same cluster.

9. A method of performing a distributed verification with respect to measurement data collected by an aggregator in a verifier as embodied by a computer, the method comprising:

choosing a predetermined number of sensors according to verification request data received from the aggregator;

verifying the aggregator using measurement data received from the predetermined number of sensors;

generating a signature using a key shared with the aggregator;

transmitting the signature to the aggregator;

transmitting, by the aggregator, an aggregation result with respect to the measurement data to a base station when the aggregator is verified; and verifying, by the base station, the aggregation result, wherein the transmitting of the aggregation result comprises:

generating a message authentication code (MAC) with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

10. The method of claim 9, further comprising:

receiving the measurement data from each of a plurality of sensors existing in a same cluster;

verifying the measurement data; and transmitting verification request data with respect to the generated measurement data using a key shared with the verifier;

wherein the verification request data includes the measurement data and the MAC generated using a key shared between the aggregator and the verifier.

11. The method of claim 9, further comprising:

calculating the MAC with respect to the measurement data using the key shared with the base station;

generating an aggregation result including the measurement data, the MAC, and the signature; and transmitting the aggregation result to the base station.

12. The method of claim 9, wherein the verifying of the aggregator comprises:

receiving the measurement data from the predetermined number of sensors;

extracting second measurement data included in the verification request data; and verifying the aggregator if the measurement data and the second measurement data are identical.

13. A non-transitory computer-readable recording medium storing a program to implement a method of performing a distributed verification with respect to measurement data in a sensor network, the method comprising:

verifying, by an aggregator, the measurement data received from each of a plurality of sensors;

generating, by the aggregator, verification request data using the verified measurement data and transmitting the verification request data to a verifier;

verifying, by the verifier, the aggregator via a predetermined number of sensors of the plurality of sensors and the verification request data;

transmitting, by the aggregator, an aggregation result with respect to the measurement data to a base station when the aggregator is verified; and verifying, by the base station, the aggregation result, wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

14. A system to perform a distributed verification with respect to measurement data in a sensor network, the system comprising:

a plurality of sensors to generate measurement data;

an aggregator to receive the measurement data from the plurality of sensors and to generate verification request data based on the measurement data; and a verifier to verify the aggregator via the verification request data and a predetermined number of sensors of the plurality of sensors, wherein the aggregator transmits an aggregation result with respect to the measurement data to a base station when the aggregator is verified, and wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

15. The system of claim 14, wherein the aggregator comprises:

a receiving unit to receive the measurement data and a plurality of first message authentication codes (MACs) associated with the measurement data from the plurality of sensors;

a MAC calculation unit to calculate a plurality of second MACs with respect to the measurement data using a plurality of keys shared between each of the plurality of sensors and the aggregator; and a measurement data verification unit to verify the measurement data when the plurality of first MACs and the plurality of second MACs are identical.

16. The system of claim 15, wherein the aggregator further comprises:

another MAC calculation unit to calculate a third MAC with respect to the measurement data using a key shared between the verifier and the aggregator;

a verification request data generation unit to generate the verification request data including the measurement data and the third MAC; and a transmission unit to transmit the verification request data to the verifier.

17. The system of claim 14, wherein the verifier comprises:

a verification request data verification unit to verify the verification request data received from the aggregator;

a measurement data request unit to request measurement data from each of the predetermined number of sensors, the predetermined number of sensors being randomly chosen;

an aggregator verification unit to verify the aggregator based on the measurement data received according to the request; and a transmission unit to transmit a signature based on the verification and a MAC with respect to the signature to the aggregator.

18. The system of claim 14, wherein the aggregation result includes the signature generated by the verifier, the measurement data, and a MAC with respect to the measurement data.

19. The method according to claim 2, wherein the calculating of the plurality of second MACs comprises calculating the plurality of second MACs using a one-way hash function.

20. An aggregator to collect measurement data in a distributed sensor network, the aggregator comprising:

a receiving unit to receive measure data and a first message authentication code (MAC) from a plurality of sensors;

a MAC calculation unit to calculate a second MAC based on the measurement data and the first MAC;

a measurement data verification unit to verify the measurement data using the first MAC and the second MAC;

an aggregator to transmit an aggregation result with respect to the measurement data to a base station when the aggregator is verified; and a base station to verify the aggregation result, wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

21. The aggregator of claim 20, wherein the measurement data verification unit verifies the measurement data if the first MAC and the second MAC are identical.

22. The aggregator of claim 20, further comprising:

another MAC calculation unit to calculate a third MAC;

a verification request data generation unit to generate verification request data including the measurement data and the third MAC; and a transmission unit to transmit the verification request data to a verifier.

23. The aggregator of claim 20, further comprising:

a transmission unit to transmit a signature and an aggregation result based on the measurement data to a base station;

wherein the aggregator receives the signature from a verifier.

24. A method of securing a sensor network as embodied by a computer, the method comprising:

receiving verification request data from an aggregator;

verifying the aggregator using measurement data received from a randomly selected predetermined number of sensors;

generating a signature using a key shared with the aggregator;

transmitting the signature to the aggregator if the aggregator is verified;

transmitting, by the aggregator, an aggregation result with respect to the measurement data to a base station when the aggregator is verified; and verifying, by the base station, the aggregation result, wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value; and transmitting the aggregation result to the base station.

25. The method of claim 24, wherein the verifying of the aggregator comprises:

verifying the verification request data received from the aggregator;

requesting the measurement data from each of the randomly selected predetermined number of sensors; and verifying the aggregator based on the received measurement data.

26. The method of claim 25, wherein:

the verification request data includes measurement data collected by the aggregator and a first message authentication code (MAC) related to the measurement data collected by the aggregator; and verifying the verification request data comprises calculating a second MAC based on the measurement data collected by the aggregator and verifying the verification request data if the first MAC and the second MAC are identical.

27. The method of claim 24, wherein the verifying of the aggregator comprises:

receiving the measurement data from the randomly selected predetermined number of sensors;

extracting measurement data from the verification request data; and verifying the aggregator if the measurement data from the randomly selected predetermined number of sensors is identical to the measurement data extracted from the verification request data.

28. The method of claim 24, wherein:

the generating of the signature comprises generating the signature using the key shared with the aggregator and generating a MAC based on the signature; and the transmitting of the signature comprises transmitting the signature and the MAC to the aggregator.

29. The system of claim 18, wherein the verifier is randomly chosen by the base station from a plurality of verifiers.

30. A method of performing a distributed verification with respect to measurement data in a sensor network as embodied by a computer, the method comprising:

verifying, by an aggregator, the measurement data received from each of a plurality of sensors;

generating, by the aggregator, verification request data using the verified measurement data;

transmitting the verification request data to a verifier;

verifying, by the verifier, the aggregator via a predetermined number of sensors out of the plurality of sensors and the verification request data; and transmitting, by the aggregator, an aggregation result with respect to the measurement data to a base station when the aggregator is verified, wherein the transmitting of the aggregation result comprises:

generating a MAC with respect to the measurement data using a key shared between the aggregator and the base station;

calculating a verification value using a signature received from the verifier and a predetermined calculation method with respect to the MAC;

generating the aggregation result including the measurement data and the verification value;

transmitting the aggregation result to the base station; and verifying, by the base station, the aggregation result, wherein the verifying of the aggregation result comprises:

calculating a first verification value using the signature received from the verifier and the measurement data included in the aggregation result; and verifying the aggregation result when the first verification value and a second verification value are identical, the second verification value being further included in the aggregation result.

31. A method of performing a distributed verification with respect to measurement data in a sensor network as embodied by a computer, the method comprising:

verifying, by an aggregator, the measurement data received from each of a plurality of sensors;

generating, by the aggregator, verification request data using the verified measurement data;

transmitting the verification request data to a verifier;

verifying, by the verifier, the aggregator via a predetermined number of sensors out of the plurality of sensors and the verification request data;

transmitting, by the aggregator, an aggregation result with respect to the measurement data to a base station when the aggregator is verified; and verifying, by the base station, the aggregation result, wherein the verifying of the aggregation result comprises:

calculating a first verification value using the signature received from the verifier and the measurement data included in the aggregation result; and verifying the aggregation result when the first verification value and a second verification value are identical, the second verification value being further included in the aggregation result.

* * * * *